(12) United States Patent
Meyer

(10) Patent No.: US 6,877,629 B2
(45) Date of Patent: Apr. 12, 2005

(54) FOOD STORAGE DEVICE

(75) Inventor: Debbie Jean Meyer, Newtown, CT (US)

(73) Assignee: Housewares America, Inc., Colonia, NJ (US)

( * ) Notice: Subject to any disclaimer, the term of this patent is extended or adjusted under 35 U.S.C. 154(b) by 100 days.

(21) Appl. No.: 10/403,194

(22) Filed: Mar. 31, 2003

(65) Prior Publication Data

US 2004/0188437 A1 Sep. 30, 2004

(51) Int. Cl.$^7$ .................... B65D 51/16; B65D 85/36
(52) U.S. Cl. .......... 220/212; 220/231; 220/203.16; 220/203.29; 220/367.1; 220/378; 220/377; 220/DIG. 16; 215/228; 215/262; 215/230; 206/459.1; 206/524.8; 116/270; 417/524; 141/65
(58) Field of Search ............ 220/203.11, 203.18, 220/203.29, 377, 378, 212, 231; 215/228, 230, 262; 206/459.1, 524.8, 77; 116/270; 141/65; 312/114; 248/150, 151, 176.1, 346.01; 417/523, 524, 550, 555.1

(56) References Cited

U.S. PATENT DOCUMENTS

| | | | |
|---|---|---|---|
| 877,796 A | * | 1/1908 | Olson ................... 312/284 |
| 1,800,491 A | | 4/1931 | Zoia |
| 2,530,910 A | * | 11/1950 | Schnabel ............... 312/322 |
| 2,669,176 A | | 2/1954 | Lazerus |
| 2,772,018 A | | 11/1956 | Weiss |
| 2,916,173 A | | 12/1959 | Klingler |
| 3,306,311 A | | 2/1967 | Buerger |
| 3,330,610 A | * | 7/1967 | Schnabel ............... 312/284 |
| 3,511,288 A | * | 5/1970 | Swett et al. ........... 206/45.2 |
| 3,672,114 A | | 6/1972 | Sacks |
| 3,815,736 A | | 6/1974 | Sedlak |
| 3,943,987 A | * | 3/1976 | Rossi ................... 206/524.8 |
| 4,149,650 A | | 4/1979 | Whelchel et al. |
| 4,218,967 A | | 8/1980 | Batchelor |
| D270,322 S | * | 8/1983 | Daenen et al. .......... D7/629 |
| 4,909,014 A | * | 3/1990 | Kobayashi et al. ........ 53/86 |
| 4,942,970 A | | 7/1990 | Jay |
| 4,989,745 A | | 2/1991 | Schneider |
| 5,347,918 A | * | 9/1994 | Chen ................... 99/472 |
| 5,406,992 A | | 4/1995 | Miramon |
| 5,469,979 A | * | 11/1995 | Chiou ................... 215/228 |
| 5,535,900 A | | 7/1996 | Huang |
| 5,546,997 A | | 8/1996 | Miramon |
| D373,708 S | | 9/1996 | Hamilton et al. |
| 5,558,243 A | | 9/1996 | Chu |
| 5,564,480 A | | 10/1996 | Chen |
| 5,564,581 A | | 10/1996 | Lin |
| 5,611,376 A | | 3/1997 | Chuang |
| D384,554 S | | 10/1997 | Ancona et al. |
| 5,692,632 A | | 12/1997 | Hsieh et al. |
| 5,697,510 A | * | 12/1997 | Wang et al. ............ 215/262 |

(Continued)

Primary Examiner—Stephen K. Cronin
Assistant Examiner—James N Smalley
(74) Attorney, Agent, or Firm—Frishauf, Holtz, Goodman & Chick, P.C.

(57) ABSTRACT

Container for storing food products including a base defining a product support surface for supporting the food product and a cover releasably engaging with the base such that when the cover engages with the base, a storage compartment is defined by the cover and the base. The cover includes an air control unit for controlling air pressure in the storage compartment and a window extending downward from the air control unit to surround food products in the storage compartment. A product supported on the product support surface of the base is visible through the window when the cover engages with the base. By providing the window as part of the cover, the base is separable from the window to thereby expose the product support surface of the base so that cakes can be easily placed on the product support surface and then enclosed by the cover.

30 Claims, 3 Drawing Sheets

U.S. PATENT DOCUMENTS

| | | |
|---|---|---|
| 5,779,082 A | 7/1998 | Miramon |
| 5,803,282 A | 9/1998 | Chen et al. |
| 5,806,575 A * | 9/1998 | Tsay .......................... 141/65 |
| D405,651 S | 2/1999 | Schmidt |
| 6,044,756 A * | 4/2000 | Chang ........................ 99/472 |
| 6,206,220 B1 | 3/2001 | Stodd |
| D473,429 S * | 4/2003 | Osborne et al. ............. D7/611 |
| 6,725,632 B1 * | 4/2004 | Glucksman et al. .......... 53/510 |

* cited by examiner

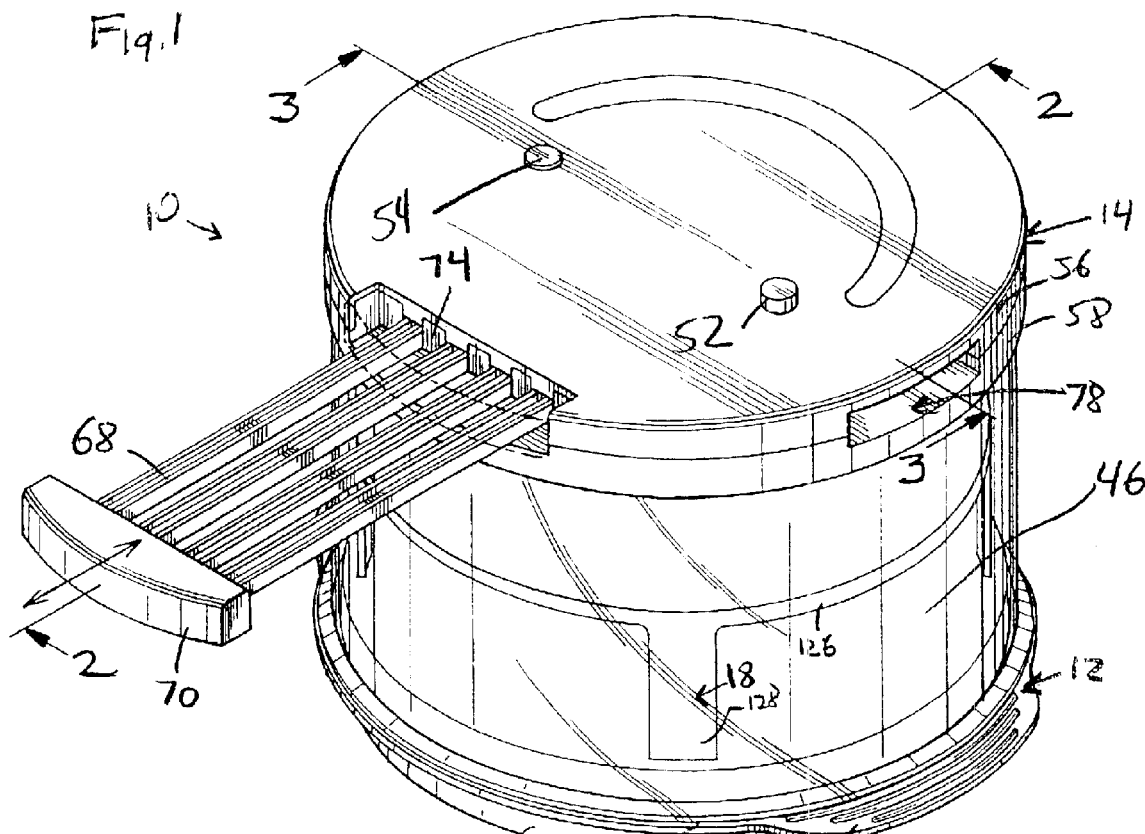

FOOD STORAGE DEVICE

FIELD OF THE INVENTION

The present invention relates generally to devices for storing food products, and more particularly to devices for storing food products to maintain the freshness of the food.

BACKGROUND OF THE INVENTION

The freshness of many food products is preserved by storing them in sealed containers since spoilage of food is accelerated by exposure to air, either through the effects of moisture in air or the oxidative effects of atmospheric oxygen. Food is thus commonly stored before an initial use and between uses in closed, tightly sealed containers in an effort to preserve and extend the useful life of the food by limiting the supply of air that the food is exposed to.

Various sizes and shapes of sealed containers are used to contain and store food away from the components of air which cause oxidation and moisture spoilage. These sealed containers are normally used, however, as simple closed vessels for preventing the food from being exposed to air. When food is stored in typical sealed containers, there is usually accompanying air which is trapped within the sealed container. This accompanying air can still have detrimental effects on the useful life of the enclosed food. When the container is opened to access the food stored therein, a new volume of air is trapped in the container when it is re-sealed which causes the continued deterioration of the quality of the stored food.

As such, storage containers have been developed which provide an airtight seal and which are configured to allow the evacuation of the accompanying air from the space around the enclosed food. Such containers usually include a manually operated or electrically-powered mechanism for evacuating air from the container.

Containers including a manually operated mechanism for evacuating air from an interior of a container are described, for example, in U.S. Pat. Nos. 5,558,243, 5,564,480, 5,564,581, 5,611,376, 5,692,632 and 5,803,282, all of which are incorporated by reference herein. Generally, the containers include a vacuum pump manually actuated by reciprocating a piston rod in the pump, applying external force to the body of the pump or squeezing it.

Containers including an electrically-powered mechanism for evacuating air from the interior of a container are described in U.S. Pat. No. 5,964,255, incorporated by reference herein. These containers include a vacuum pump arranged in a base and operable by battery power and a switch for supplying power to the pump when desired.

Generally, the prior art containers include a vessel defining a storage receptacle and a cover engaging with an upper lip of the vessel to enclose the receptacle. Thus, the opening of the receptacle is arranged at the top of the vessel.

It is a problem with such prior art containers that it is difficult if not impossible to store relatively large, planar food products such as cakes therein since the cakes can only be dropped into the containers through the opening at the top of the vessel. It is not possible to gently place the cake on the bottom surface of the vessel because there is insufficient room to place the cake while holding it from its bottom. Dropping the cake into the container will invariably result in damage to the cake. Thus, such containers cannot practically be used to store cakes and other large food products.

OBJECTS AND SUMMARY OF THE INVENTION

It is therefore an object of the present invention to provide a container for storing food products which enables the creation of a vacuum therein to thereby prevent exposure of the food products to air.

It is another object of the present invention to provide a container for storing food products which has a reversible base which enables the container to have a display position in which the food products can be displayed and a storage position in which the space in the container is maximized.

It is another object of the present invention to provide a container for storing cakes and other large food products in a vacuum environment which allows the cakes to be gently placed in the container without causing damage thereto.

In order to achieve these objects and others, a container in accordance with the present invention generally includes a base defining a product support surface for supporting a product and a cover releasably engaging with the base such that when the cover engages with the base, a storage compartment is defined by the cover and the base. The cover includes an air control unit for controlling air pressure in the storage compartment and a window extending downward from the air control unit to surround food products in the storage compartment. A product supported on the product support surface of the base is visible through the window when the cover engages with the base.

By providing the window as part of the cover, the base is separable from the window to thereby expose the product support surface of the base so that cakes can be easily placed on the product support surface and then enclosed by the cover. As such, the cakes do not have to be dropped into the container as in prior art containers.

In one embodiment, a platform can be arranged on the base and the base is provided with slots to position the platform on the base. The platform includes a product support surface so that when used, two products can be stored and displayed in the container, e.g., two cakes.

In another embodiment, the base is reversible in that it is engageable with the cover in a product display position in which a planar section providing the product support surface is surrounded by the window and alternately in a reversed, storage position in which the planar section forms the bottom of the storage compartment and a hollow interior of the base is part of the storage compartment.

In another embodiment, the container includes a base defining a product support surface for supporting a product and a cover releasably engaging with the base such that when the cover engages with the base, a storage compartment is defined by the cover and the base. The cover includes an air control unit for controlling air pressure in the storage compartment which includes a housing and a pump arranged in connection therewith for evacuating air from the storage compartment. The pump includes cylinders, pistons each movable in a respective cylinder, piston rods each connected to a respective piston and movable in the respective cylinder, a displaceable handle connected to the piston rods and one-way check valves arranged in communication with the cylinders for allowing air flow only into the cylinders therethrough. Each check valve is arranged in communication with a plurality of the cylinders, e.g., two cylinders.

An advantage of this arrangement is that with each stroke of the handle to pull the pistons away from the check valves, twice as much air flows through each check valve in comparison with an arrangement wherein each check valve is associated with only a single cylinder.

BRIEF DESCRIPTION OF THE DRAWINGS

The invention, together with further objects and advantages hereof, may best be understood by reference to the following description taken in conjunction with the accompanying drawings, wherein like reference numerals identify like elements.

FIG. 1 is a perspective view of the container in accordance with the invention showing the pump handle in an extended position.

FIG. 2 is a cross-sectional side view taken along the line 2—2 of FIG. 1 with the pump handle in a stowed position.

DETAILED DESCRIPTION OF THE INVENTION

Figure 3:
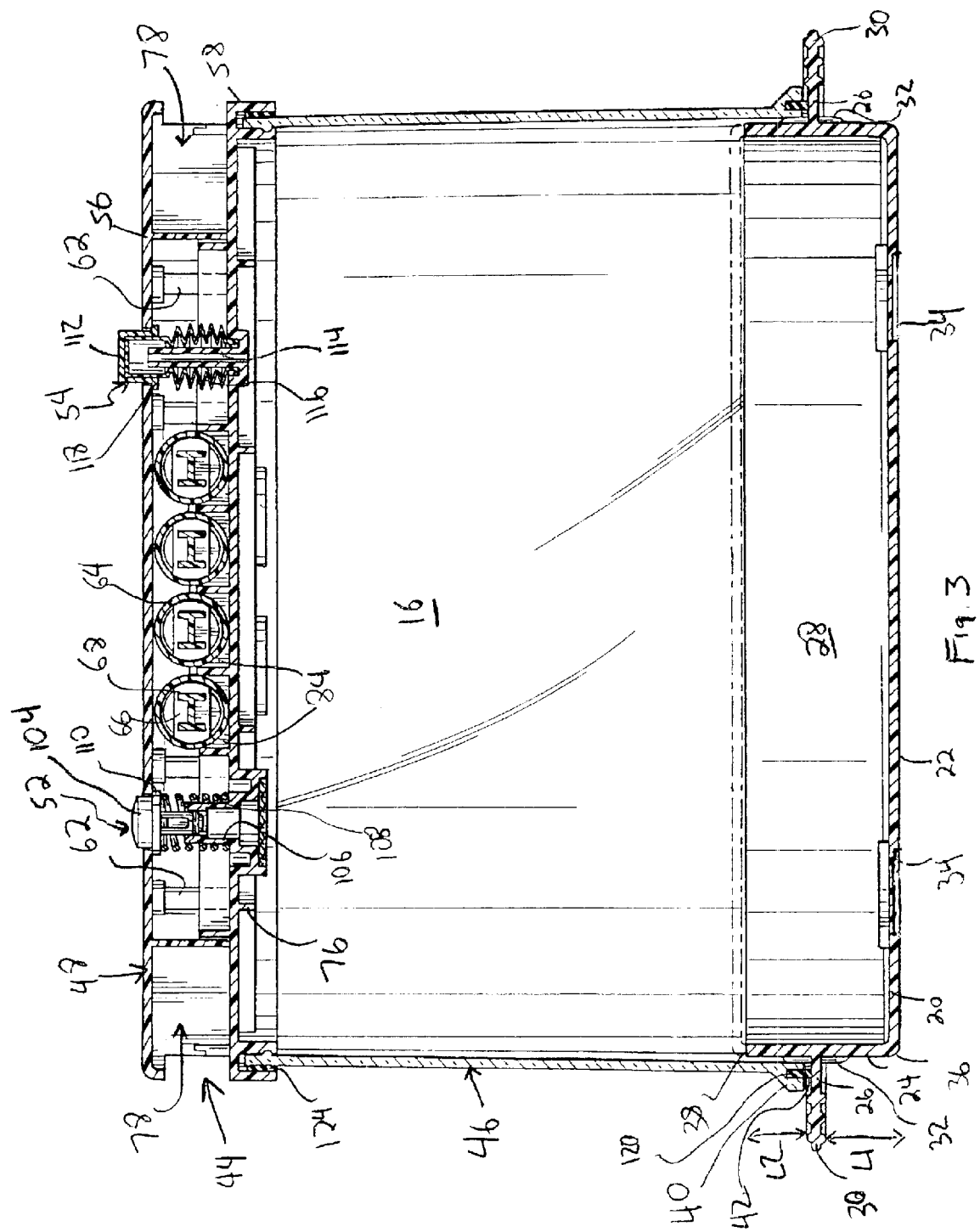
FIG. 3 is a cross-sectional front view taken along the line 3—3 of FIG. 1 with the base turned upside down for use as a deep dish tray and with a platform removed.

FIG. 1 shows a container in accordance with the present invention designated generally as 10 and which includes a base 12, a cover 14 engaging with the base to define an interior storage compartment 16 (FIG. 2) and a platform 18 supported on the base inside the storage compartment.

The base 12 is preferably reversible relative to the cover 14 in that it has a unique structure which enables it to engage with the cover 14 in two ways. In one way shown in FIGS. 1 and 2, the base is positioned to serve as a platform to support and display food products. In the other way shown in FIG. 3, the base is positioned to serve as a deep dish tray for maximizing the available storage space of the interior storage compartment 16 of container 10.

To provide for these different functions and with reference to FIG. 2, the base 12 preferably includes a planar section 20 having an upper surface 22 constituting a product support surface, a rim 24 arranged around the periphery of the planar section and a flange 26 extending outward from the rim. The cover 14 rests on the flange 26 when the cover is in engagement with the base.

The planar section 20 and rim 24 of the base 12 cooperate to define a hollow interior 28, which when the base 12 is positioned for use as a deep dish tray as shown in FIG. 3, forms part of the storage compartments 16. In the illustrated embodiment, the planar section 20 is circular and the rim 24 is tubular. It is foreseen, however, that other shapes of the planar section 20, such as square or rectangular, can also be constructed so that the rim would have the same cross-sectional shape as the shape of the planar section.

The flange 26 extends from the outer surface of the rim 24 around the entire periphery of the rim 24 and includes two diametrically opposed handles 30 (FIG. 1). Handles 30 enable easy handling of the container 10 and handling of the base 12 to reverse the base 12 when desired.

Cover centering ribs 32 are arranged on the rim 24 on both sides of the flange 26 to center the cover 14 when engaging with the base 12. The cover centering ribs are preferably spaced around the periphery of the rim.

The upper surface 22 of the planar section 20 includes slots 34 for positioning the platform 18 on the base 12 (see FIG. 3). It is foreseen that other constructions for securely retaining the platform 18 on the base can be provided.

The flange 26 is preferably formed at a location on the rim 24 spaced from both the upper and lower edges 36,38 of the rim so that a sufficient space (L1,L2 as shown in FIG. 3) remains between the flange 26 and both the upper and lower edges 36,38 to enable the cover 14 to be secured about the rim when the cover rests on the flange. Specifically, the flange is constructed on the rim to enable the rim to extend above a lower sealing lip 40 of the cover when the cover is placed on the flange regardless of the orientation of the base relative to the cover. Thus, the flange can be constructed to be equidistant from the upper and lower edges of the rim.

When the base 12 is used as a platform in a product display position, i.e., with the planar section 20 above the flange 26, the cover 14 is placed onto the base such that a bottom seal 42 of the cover rests on the flange and the upper edge 36 of the rim is above the lower sealing lip 40 of the cover 14 (see FIG. 2). On the other hand, when the base 12 is reoriented from the position shown in FIG. 2 to the position shown in FIG. 3 for use as a deep dish tray in a storage position, the cover is placed onto the base such that the bottom seal 42 of the cover rests on the flange and the lower edge 38 of the rim is above the lower sealing lip of the cover. By providing an edge of the rim above the lower sealing lip of the cover when the cover is engaged with the base, a tight seal is formed when air is evacuated from the storage compartment 16.

The cover 14 preferably includes an air control unit 44 for controlling the air pressure in the storage compartment 16 and a window 46 extending downward from and attached to the air control unit. The window may be transparent so that a product in the storage compartment is visible through the window. In the illustrated embodiment, the window is tubular but it is foreseen that the shape can be varied to conform with the shape of the base 12.

The air control unit 44 includes a housing 48, a pump 50 arranged in connection with the housing for evacuating air from the storage compartment 16 defined when the cover 14 engages the base 12, a pressure relief device 52 arranged in connection with the housing for allowing air flow into the storage compartment, and a vacuum indicator 54 arranged in connection with the housing for indicating when a vacuum is obtained in the storage compartment by the evacuation of air by the pump.

As shown in FIG. 3, the housing 48 includes upper and lower walls 56,58 attached to one another by an appropriate attachment mechanism such as screws 60 and the like. Posts 62 are therefore formed in the lower wall having apertures therein and which align with apertures in the upper wall to enable the screws to connect the upper wall to the lower wall.

The pump 50 includes cylinders 64, pistons 66 each movably arranged in a respective cylinder, piston rods 68 each connected to a respective piston and movable in respective cylinders, a displaceable handle 70 connected to the piston rods, and one-way check valves 72 arranged in communication with the cylinders.

To prevent removal of the piston rods 68 from the cylinders 64, the housing 48 includes stops 74 arranged at the rear of each cylinder. The stops may be formed by downward descending portions of the upper wall 56. Reinforcing ribs 76 are arranged on the lower wall 58 of the housing 48. Cover grips 78 are formed at opposite locations on the housing by the upper and lower walls to enable the cover 14, and the container 10 in its entirety when the cover is secured to the base 12, to be easily held and manipulated.

The cylinders 64 are fixed in the housing 48 between the upper and lower walls 56,58 and include an elongate tubular portion 80 in which a piston 66 and associated piston rod 68 move and a front, curved portion 82 alongside a check valve 72. The lower wall includes cradling ribs 84 for positioning the cylinders 64 relative to the check valves 72 (see FIGS. 3 and 4) and channels 86 for receiving the ends 88 of the front portion 82 of the cylinders (see FIG. 5). Seal rings 90 are arranged in the channels 86 so that the ends of the front portion of the cylinders are clamped against the seal rings when the upper and lower walls are attached to one another.

The check valves 72 are interposed between the cylinders 64 and the storage compartment 16 to allow air flow only from the storage compartment 16 into the cylinders 64 but not from the cylinders to the storage compartment 18. Hence, a one-way flow of air is provided by the check valves.

Figure 5:
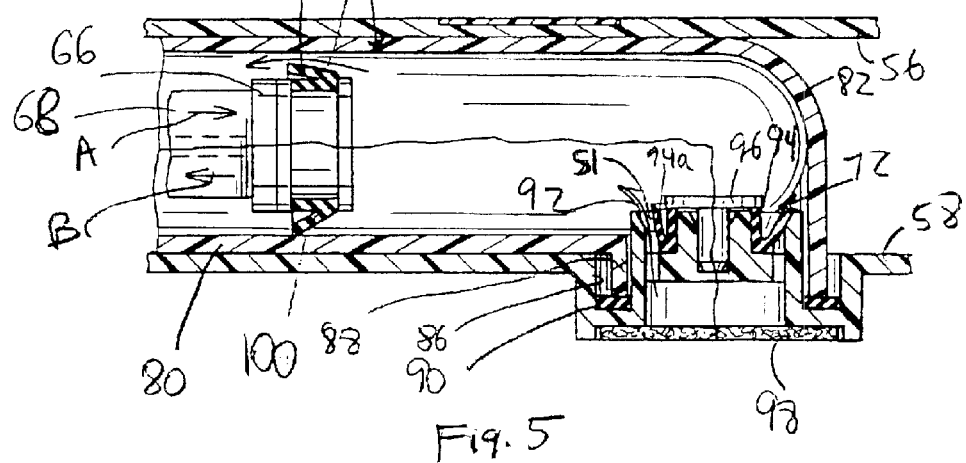
FIG. 5 is a fragmentary cross-sectional side view taken along the line 5—5 of FIG. 4 split into two halves to illustrate air pump flow.

To achieve this, each check valve 72 includes a valve seat 92 formed in the lower wall 58 of the housing 48, a flexible annular seal 94 arranged in the valve seat and a seat retaining cap 96 arranged in engagement with the valve seat to secure the flexible annular seal in the valve seat (see FIG. 5). The seal is constructed such that a portion 94a flexes upon the generation of a lower pressure or vacuum in the cylinders 64 than in the storage compartment 16, which lower pressure or vacuum is caused by rearward movement of the pistons 66 from the cylinders. Flexure of the seal opens a space S1 between the seal and the valve seat through which air from the storage compartment flows into the cylinders. The seal is also constructed to avoid such flexure when a high pressure prevails in the cylinders caused by the forward movement of the pistons.

Check valves having a construction different than that shown in the drawings and described above but which enable a one-way flow of air can also be used in the invention.

Figure 4:
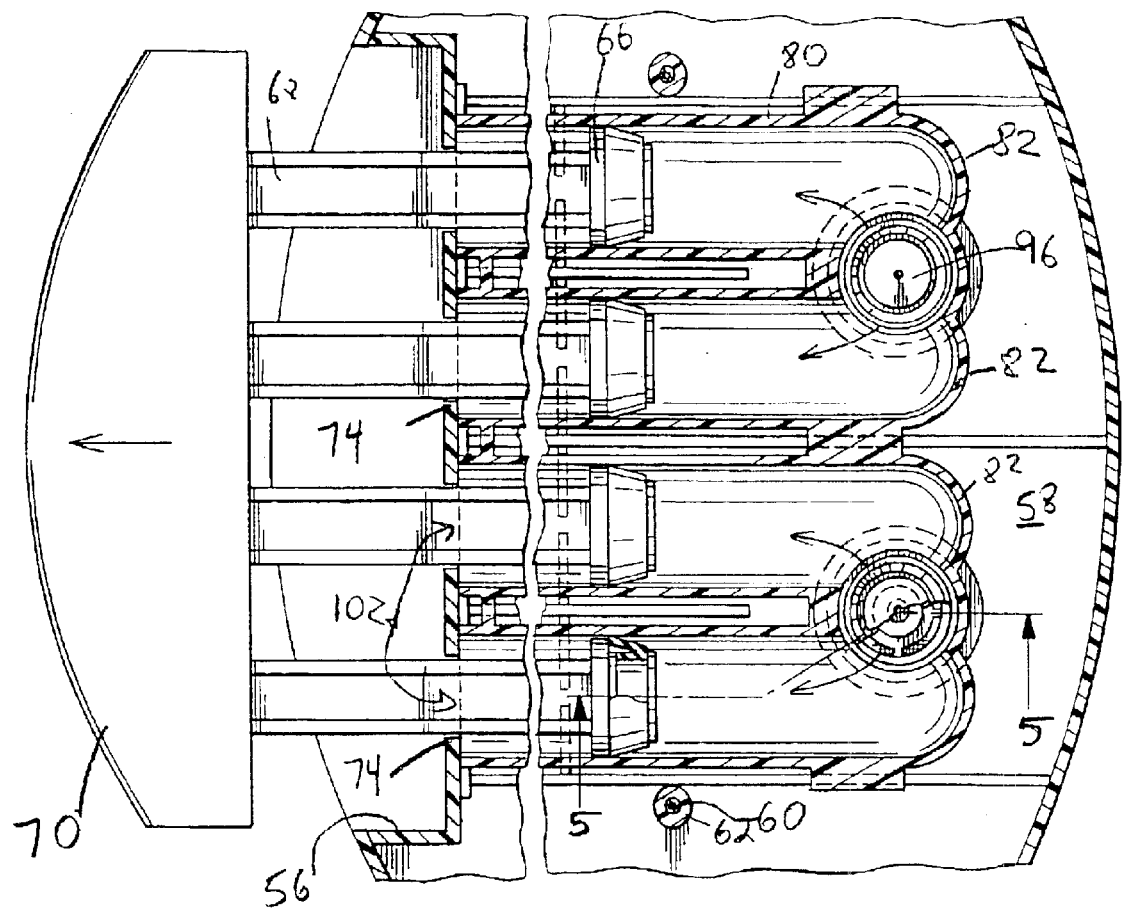
FIG. 4 is a fragmentary sectional plan view taken along the line 4—4 of FIG. 2 with the pump handle in an extended position.

As shown in FIG. 4, there are two check valves 72 with each check valve communicating with two cylinders 64. An advantage is thus obtained since twice as much air is removed from the storage compartment 16 through each check valve in each stroke of the pistons than in prior art designs wherein each valve is associated with only a single cylinder.

A filter 98 is arranged below each check valve 72 and releasably secured to the lower wall 58 of the housing 48 to prevent, among other things, clogging of the filter.

Each piston rod 68 is a substantially H-shaped shaft having a front end arranged in the respective cylinder 64 and a rear end fixed to the handle 70. A seal 100 is arranged at the front end of the piston rod 68 around the piston 66, and is constructed such that a portion 100a flexes as the piston moves forward (in the direction of arrow A in FIG. 5) into the cylinder. Flexure of the seal 100 opens a space S2 between the seal and the cylinder 64 through which air in the cylinder flows to the rear of the piston and into the atmosphere through a space 102 between the upper and lower walls 56,58 of the housing 48 (see FIGS. 1 and 5). The seal 100 is also constructed to avoid such flexure when the piston 66 is moved rearward in the cylinder (in the direction of arrow B in FIG. 5).

To evacuate the storage compartment 16 when the cover 14 is engaged with the base 12, the pump handle 70 is pulled outward from a stowed position so that the piston rods 68 and pistons 66 are pulled rearward in the cylinders 64. This causes a lower pressure or vacuum to be generated in that portion of the cylinders between the pistons and the check valves 72 than in the storage compartment 16 so that air in the storage compartment 16 flows through the check valves into the cylinders. When the pump handle is pushed inward, the piston rods are moved forward and the pistons compress the air in the cylinders until the piston seals 100 separate from the walls of the cylinder and the space S2 opens allowing the air in the cylinders to flow rearward over the piston seals 100 and out of the cylinders. Air in the cylinders cannot flow back into the storage compartment because the seal 94 is pressed against the valve seat.

The continued pulling and pushing movement of the pump handle 70 gradually causes a reduction in the pressure in the storage compartment 16. As the pressure in the storage compartment is reduced, the vacuum indicator 54 is lowered. When the vacuum indicator is close to or flush with the upper wall 56 of the housing 48, it indicates that a sufficient vacuum is present in the storage compartment. The vacuum is effective to safeguard the freshness of any food products in the storage compartment.

When it is desired to serve the food products in the storage compartment 16, the storage compartment must be re-pressurized by allowing air into the storage compartment via the pressure relief device 52. The pressure relief device includes a button 104 slidably engaged in a tubular projection 106 extending from the lower wall 58 of the housing 48 of the air control unit 44 and a spring 108 arranged around the projection 106 for biasing the button 104 such that it extends through an aperture in the upper wall 56 of the housing 48 of the air control unit 44 and an annular flange 110 of the button abuts against the lower surface of the upper wall. A lower body portion of the button below the flange slides in the tubular projection and defines a passage between the interior of the tubular projection and the interior of the housing of the air control unit. A sealing ring 112 is arranged around the lower body portion to prevent atmospheric air from entering into the storage compartment 16 when the button is not depressed.

In operation, to relieve the pressure in the storage compartment 16, i.e., introduce atmospheric air into the storage compartment, the button 104 is depressed against the bias provided by the spring 108 so that the flange 110 is displaced from the upper wall 56 of the housing 48 of the air control unit 44. Air then flows around the button through the space between the flange and the upper wall 56 of the housing, then through the coils of the spring and into the passage in the lower body portion of the button and then from this passage through the tubular projection 106 into the storage compartment. The amount of air introduced into the storage compartment is regulated by the duration of the pressing of the button.

The vacuum indicator 54 includes a cap 112 and a bellows member 114 having an upper closed end arranged in the cap. The bellows member is arranged around a tubular projection 116 extending from the lower wall 58 of the housing 48 of the air control unit 44 and a bottom of the bellows member is secured to the housing. The cap is biased such that, when atmospheric pressure prevails in the storage compartment 16, it extends through an aperture in the upper wall 56 of the housing and an annular flange 118 of the cap abuts against the lower surface of the upper wall 56. A spring (not shown) may be arranged around the tubular projection to bias the cap against the upper wall of the housing.

One particular construction of the pump 50, pressure relief device 52 and vacuum indicator 54 is shown in the drawings and described above. However, other manual or automatic means for evacuating air from the storage compartment can be applied in the invention. Also, the pressure relief device 52 can take various forms and any type of pressure relief device, including those in the prior art cited above, can be applied in the invention. The vacuum indicator 54 can take various forms, including those in the prior art cited above, which can be applied in the invention. Other features of the prior art cited above can also be applied in the invention, such as the calendar incorporated into the cover of the container shown in U.S. Pat. No. 5,803,282. Moreover, the vacuum indicator 54 is an optional element since it provides an indication as to when pumping can be stopped, but is not an essential feature of the air control unit in accordance with the invention.

Referring back to FIGS. 2 and 3, the window 46 includes a lower sealing lip 40 having a lower surface with a groove 120 therein. An O-ring 122 or other sealing member is placed in the groove to facilitate sealing between the cover 14 and the base 12.

The upper edge of the window 46 is retained in connection with the air control unit 44 with an appropriate seal 124 to prevent air flow between the window 46 and the air control unit 44.

As shown in FIG. 3, the platform 18 includes a planar section 126 on which food products can be placed and a support structure for elevating the planar section above the base 12. The support structure includes a plurality of vertical legs 128 extending downward from the planar section and spaced around the periphery of the planar section to enable the platform to rest in a stable position. The bottom of each leg is sized to fit securely within the slot 34 formed in the upper surface 22 of the base 12 to thereby enable the platform to be retained in connection with the base 12.

Reinforcing members 130 are optionally arranged at the corners between the planar section 126 and the legs 128 to strengthen the support provided by the legs.

The platform 18 can be formed as an integral structure, with the planar section 126, legs 128 and optional reinforcing members 130 being integral with one another and possibly fabricated from the same material and at the same time. In one embodiment, the platform 18 is made from a hard, clear plastic.

The height of the legs 128 may be selected to elevate the planar section 126 above the base 12 to enable multiple food products to be stored in the storage compartment 16. For example, as shown in FIG. 3, the legs elevate the planar section so that two cakes 132,134 (shown in dotted lines) can be stored, one cake 132 is between the base and the planar section of the platform 18 and the other cake 134 rests on the planar section 126.

Although illustrative embodiments of the present invention have been described herein with reference to the accompanying drawings, it is to be understood that the invention is not limited to these precise embodiments, and that various other changes and modifications may be effected therein by one of ordinary skill in the art without departing from the scope or spirit of the invention.

I claim:

1. A container, comprising:
   a base defining a product support surface for supporting a product; and
   a cover releasably engaging with said base such that when said cover engages with said base, a storage compartment is defined by said cover and said base,
   said cover including an air control unit for controlling air pressure in said storage compartment and a window extending downward from said air control unit, said window being arranged to engage with said base such that a product supported on said product support surface of said base is visible through said window when said cover engages with said base,
   said air control unit including a housing and a pump arranged in connection with said housing for evacuating air from said storage compartment,
   said pump comprising cylinders, pistons each movable in a respective one of said cylinders, piston rods each connected to a respective one of said pistons and movable in said respective cylinder, a displacement handle connected to said piston rods and one-way check valves arranged in communication with said cylinders for allowing air flow only into said cylinders therethrough,
   each of said check valves being arranged in communication with a plurality of said cylinders.

2. The container of claim 1, further comprising a platform arranged on said base.

3. The container of claim 2, further comprising positioning means for positioning said platform on said base.

4. The container of claim 3, wherein said platform includes a planar product support section and legs extending downward from said product support section, said positioning means comprising slots formed in said base and arranged to receive a respective one of said legs.

5. The container of claim 1, wherein said base includes a planar section having an upper surface constituting said product support surface, a rim arranged around the periphery of said planar section to thereby provide said base with a hollow interior and a flange extending outward from said rim, said cover being arranged to rest on said flange when in engagement with said base.

6. The container of claim 5, wherein said flange is arranged on said rim at a location spaced from both upper and lower edges of said rim such that a predetermined space remains between said flange and both said upper and lower edges to enable said cover to be secured about said rim when said cover rests on said flange.

7. The container of claim 5, wherein said flange is substantially equidistant from upper and lower edges of said rim.

8. The container of claim 5, wherein said flange includes handlers arranged on opposite sides of said base.

9. The container of claim 5, wherein said base further includes centering ribs arranged on an outer surface of said rim on both sides of said flange for centering said cover when engaging with said base.

10. The container of claim 5, wherein said rim is tubular and encloses the hollow interior of said base in combination with said planar section.

11. The container of claim 5, wherein said base is engageable with said cover in a product display position in which said planar section is above said flange and said hollow interior is below said planar section and not part of said storage compartment and in a reversed, storage position in which said planar section is below said flange and said hollow interior is above said planar section and part of said storage compartment.

12. The container of claim 5, wherein said window includes a lower sealing lip having a groove, further comprising a sealing ring arranged in said groove and to engage with said flange when said cover engages with said base.

13. The container of claim 1, wherein said window includes a lower sealing lip having a groove, further comprising a sealing ring arranged in said groove and to engage with said base when said cover engages with said base.

14. The container of claim 1, wherein each of said piston rods includes a shaft having a front end arranged in said cylinder and a rear end fixed to said handle, further comprising a seal arranged at said front end of each of said cylinders and constructed such that a portion flexes as said piston rod is pushed inward into said cylinder to open a space between said seal and said cylinder and to prevent such flexure when said piston rod is pulled outward from said cylinder.

15. The container of claim 1, wherein said air control unit includes a pressure relief device arranged in connection with said housing for enabling air flow into said storage compartment.

16. The container of claim 1, wherein said air control unit includes a vacuum indicator for indicating when a vacuum is present in said storage compartment.

17. The container of claim 1, further comprising a seal for securing an upper edge of said window in connection with said air control unit to prevent air flow between said window and said air control unit.

18. A container, comprising:
a base defining a first product support surface for supporting a first product;
a cover releasably engaging with said base such that when said cover engages with said base, a storage compartment is defined by said cover and said base and said base supports the first product in said storage compartment, said cover including an air control unit for controlling air pressure in said storage compartment; and
a platform arranged on said base and defining a second product support surface for supporting a second product above the first product and in said storage compartment,
said air control unit including a housing and a pump arranged in connection with said housing for evacuating air from said storage compartment,
said pump comprising cylinders, pistons each movable in a respective one of said cylinders, piston rods each connected to a respective one of said pistons and movable in said respective cylinder, a displacement handle connected to said piston rods and one-way check valves arranged in communication with said cylinders for allowing air flow only into said cylinders therethrough,
each of said check valves being arranged in communication with a plurality of said cylinders.

19. The container of claim 18, further comprising positioning means for positioning said platform on said base.

20. The container of claim 19, wherein said platform includes a planar product support section and legs extending downward from said product support section, said positioning means comprising slots formed in said base and each arranged to receive a respective one of said legs.

21. The container of claim 18, wherein said platform includes a planar product support section and legs extending downward from said product support section.

22. A container, comprising:
a base defining a product support surface for supporting a product; and
a cover releasably engaging with said base such that when said cover engages with said base, a storage compartment is defined by said cover and said base and said base supports the product in said storage compartment, said cover including an air control unit for controlling air pressure in said storage compartment,
said base including a planar section having an upper surface constituting said product support surface, a rim arranged around the periphery of said planar section to thereby provide said base with a hollow interior and a flange extending outward from said rim, said cover being arranged to rest on said flange when in engagement with said base,
said air control unit including a housing and a pump arranged in connection with said housing for evacuating air from said storage compartment,
said pump comprising cylinders, pistons each movable in a respective one of said cylinders, piston rods each connected to a respective one of said pistons and movable in said respective cylinder, a displacement handle connected to said piston rods and one-way check valves arranged in communication with said cylinders for allowing air flow only into said cylinders therethrough,
each of said check valves being arranged in communication with a plurality of said cylinders.

23. The container of claim 22, wherein said base is engageable with said cover in a product display position in which said planar section is above said flange and said hollow interior is below said planar section and not part of said storage compartment and in a reversed, storage position in which said planar section is below said flange and said hollow interior is above said planar section and part of said storage compartment.

24. The container of claim 22, wherein said flange is arranged on said rim at a location spaced from both upper and lower edges of said rim such that a predetermined space remains between said flange and both said upper and lower edges to enable said cover to be secured about said rim when said cover rests on said flange.

25. The container of claim 22, wherein said flange is substantially equidistant from upper and lower edges of said rim.

26. The container of claim 22, wherein said flange includes handles arranged on opposite sides of said base.

27. The container of claim 22, wherein said base further includes centering ribs arranged on an outer surface of said rim on both sides of said flange for centering said cover when engaging with said base.

28. The container of claim 22, wherein said rim is tubular and encloses the hollow interior of said base in combination with said planar section.

29. The container of claim 22, further comprising a window which includes a lower sealing lip having a groove, and a sealing ring arranged in said groove and to engage with said flange when said cover engages with said base.

30. A container, comprising:
a base defining a product support surface for supporting a product; and
a cover releasably engaging with said base such that when said cover engages with said base, a storage compartment is defined by said cover and said base,
said cover including an air control unit for controlling air pressure in said storage compartment,
said air control unit including a housing and a pump arranged in connection with said housing for evacuating air from said storage compartment,
said pump comprising cylinders, pistons each movable in a respective one of said cylinders, piston rods each connected to a respective one of said pistons and movable in said respective cylinder, a displaceable handle connected to said piston rods and one-way check valves arranged in communication with said cylinders for allowing air flow only into said cylinders therethrough,
each of said check valves being arranged in communication with a plurality of said cylinders.

* * * * *